June 24, 1930.  A. E. HOLBROOK  1,767,887
FISHERMAN'S OUTFIT
Filed March 30, 1928  2 Sheets-Sheet 1
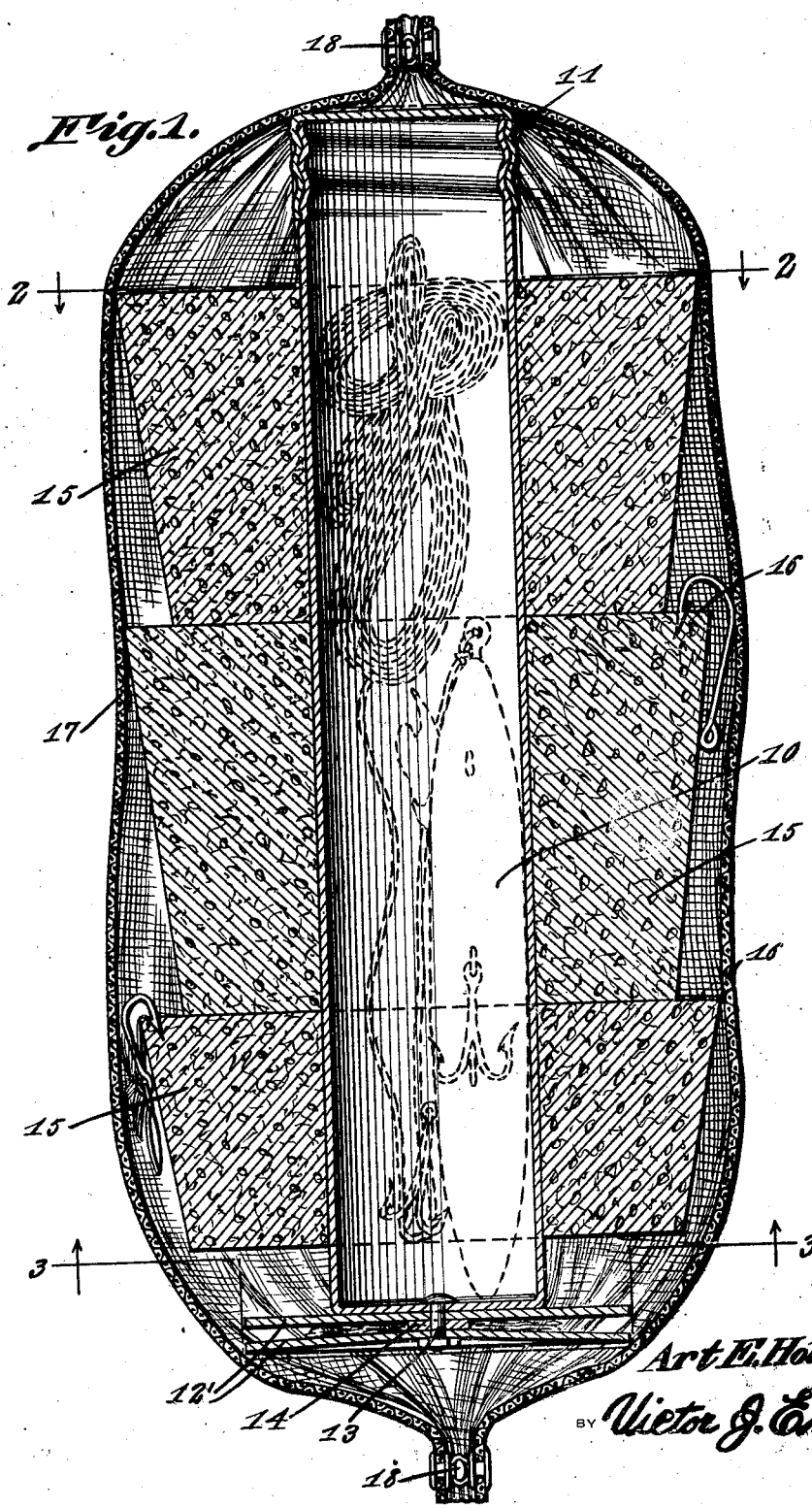

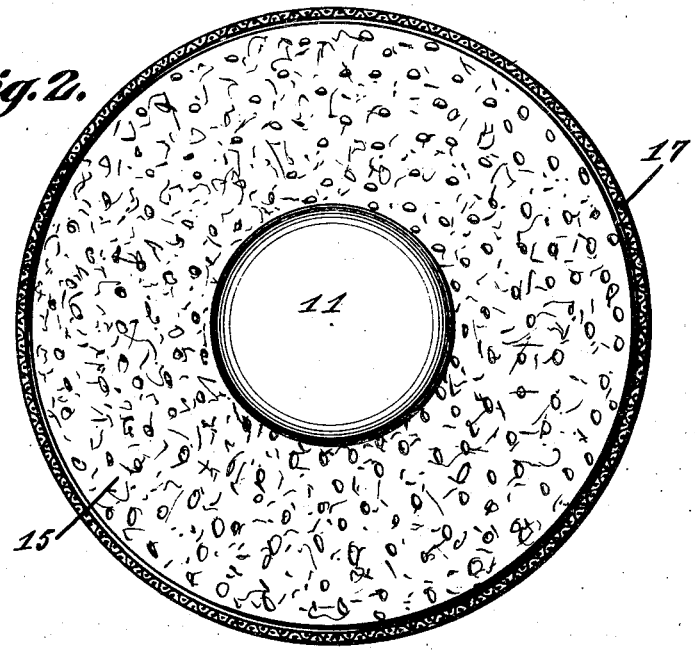
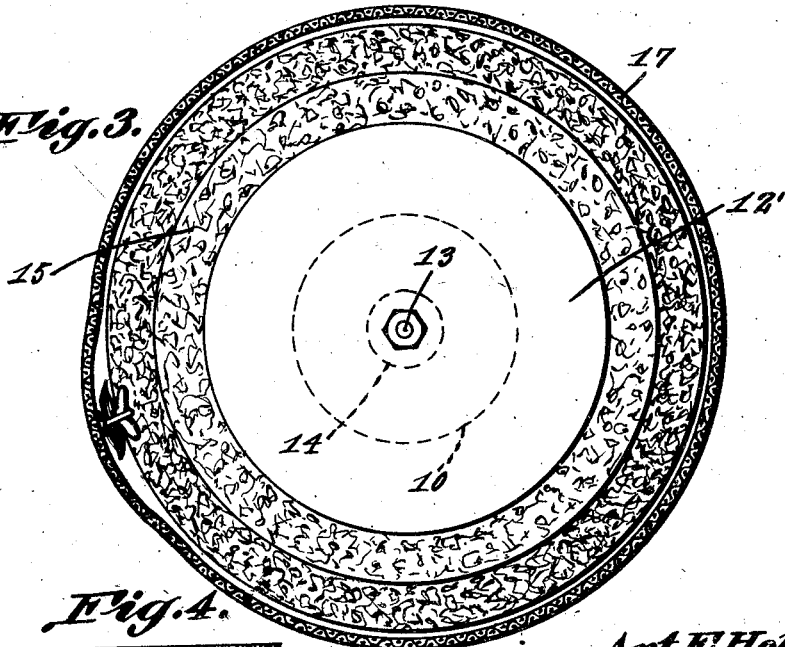
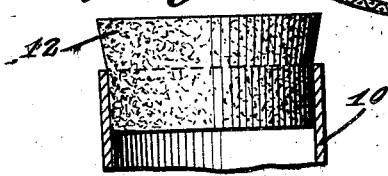

Patented June 24, 1930

1,767,887

UNITED STATES PATENT OFFICE

ART E. HOLBROOK, OF JOPLIN, MISSOURI

FISHERMAN'S OUTFIT

Application filed March 30, 1928. Serial No. 266,013.

This invention relates to a fisherman's outfit, designed to provide a convenient means of carrying all types of tackle in a single unit, with lures and hooks arranged so that they can not become entangled, and which will be readily accessible for use when desired.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a vertical sectional view through the invention.

Figure 2 is a sectional view on line 2—2 of Figure 1.

Figure 3 is a sectional view on line 3—3 of Figure 1.

Figure 4 is a fragmentary view of the tubular container showing a different type of closure therefor.

The device forming the subject matter of the present invention embodies a tubular container 10 which may be constructed from any suitable material and vary in size without departing from the inventive idea. The container is preferably closed at one end by a screw cap 11, although a plug or stopper 12 may be used as illustrated in Figure 4. The container 10 is adapted to receive certain parts of a fisherman's equipment, while secured to the bottom of the container 10 are spaced disks 12' of any suitable diameter. These disks project an appreciable distance beyond the sides of the container 10 and are secured to the bottom of the latter by a bolt 13. A washer or block 14 is arranged between the disks to hold the latter suitably spaced apart, the space between said disks being adapted to receive gut leaders, lines and the like which are wound about the bolt as illustrated.

Supported by the container 10 is a body of cork or other similar material indicated at 15, this body being bored longitudinally to receive the container 10 upon which it is pressed, being held associated therewith by friction. The cork body is stepped to form annular shoulders 16 as clearly illustrated into which may be embedded the lures or hooks as shown in Figure 1. This body 15 provides a very convenient means for carrying the various types of hooks and lures in a manner so that they do not become entangled, and at the same time permit any of the hooks or lures to be readily accessible for use. If desired, the entire device may be arranged in a suitable slip cover 17 open at both ends so that the container 10 and the cork body 15 as a unit can be inserted at either end as will be readily understood. Each end of the cover is provided with snap fasteners or the like 18, so that after the cover has been placed in position the ends can be closed, the cover also assisting in maintaining the hooks and lures straight and in proper position so that they can not become entangled.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A fisherman's outfit comprising a tubular container open at one end, a closure therefor, a body of yieldable material having a longitudinal bore to receive said container and frictionally support it thereon, said body being stepped to provide shoulders in which hooks and lures are adapted to be secured thereto and a slip cover adapted to entirely conceal said container.

2. In a fisherman's outfit comprising a tubular container open at one end, a closure therefor, spaced disks carried by the lower end of the container and between which lines or the like are adapted to be wound, a body of yieldable material having a longitudinal bore to receive said container and frictionally support it thereon, said body being formed with spaced superimposed shoulders in which hooks and lures are adapted to be embedded and supported, and a slip cover adapted to receive and completely enclose said container and body.

In testimony whereof I affix my signature.

ART E. HOLBROOK.